US012726748B2

(12) United States Patent
Li et al.

(10) Patent No.: US 12,726,748 B2
(45) Date of Patent: Sep. 1, 2026

(54) STRAP ASSEMBLY OF HEAD-MOUNTED DEVICE, HEAD-MOUNTED DEVICE

(71) Applicant: Beijing Zitiao Network Technology Co., Ltd., Beijing (CN)

(72) Inventors: Haigang Li, Beijing (CN); Zishang Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 119 days.

(21) Appl. No.: 18/833,189

(22) PCT Filed: Dec. 30, 2022

(86) PCT No.: PCT/CN2022/143732
§ 371 (c)(1),
(2) Date: Jul. 25, 2024

(87) PCT Pub. No.: WO2023/142880
PCT Pub. Date: Aug. 3, 2023

(65) Prior Publication Data
US 2025/0113131 A1 Apr. 3, 2025

(30) Foreign Application Priority Data
Jan. 26, 2022 (CN) ......................... 202210093985.1

(51) Int. Cl.
*H04R 1/02* (2006.01)

(52) U.S. Cl.
CPC ....... *H04R 1/028* (2013.01); *H04R 2201/023* (2013.01)

(58) Field of Classification Search
CPC ...................................................... H04R 1/028
See application file for complete search history.

(56) References Cited

U.S. PATENT DOCUMENTS 10,321,751 B1 * 6/2019 Magrath ............... G06F 1/1681
12,019,248 B1 * 6/2024 Hatfield ............. G02B 27/0176
2015/0296285 A1 10/2015 Proos et al.
2016/0363771 A1 * 12/2016 Miller .................... F16M 13/04
2016/0363772 A1 * 12/2016 Miller .................... F16M 13/00
2017/0052378 A1 2/2017 Yang et al.
(Continued)

FOREIGN PATENT DOCUMENTS

CN 104536135 A 4/2015
CN 107948804 A 4/2018
(Continued)

OTHER PUBLICATIONS

Office action received from Chinese patent application No. 202210093985.1 mailed on Jun. 25, 2025, 15 pages (7 pages English Translation and 8 pages Original Copy).
(Continued)

*Primary Examiner* — Olisa Anwah

(57) ABSTRACT

A strap assembly for a head-mounted device and a head-mounted device. The strap assembly of the head-mounted device includes: a fixed shell; a strap shell rotatably arranged on the fixed shell; a speaker arranged inside the strap shell. The speaker and the strap shell define a front sound cavity and a rear sound cavity that are spaced apart. The strap shell has a sound outlet hole that is in communication with the front sound cavity.

18 Claims, 4 Drawing Sheets

(56) References Cited

U.S. PATENT DOCUMENTS

| | | | | |
|---|---|---|---|---|
| 2017/0055057 | A1 | 2/2017 | Yang et al. | |
| 2018/0107005 | A1 | 4/2018 | Yang et al. | |
| 2018/0255386 | A1* | 9/2018 | Bristol | G02B 27/0176 |
| 2021/0080996 | A1* | 3/2021 | Hudman | G02B 27/0176 |

FOREIGN PATENT DOCUMENTS

| | | | |
|---|---|---|---|
| CN | 209560296 | U | 10/2019 |
| CN | 111654766 | A | 9/2020 |
| CN | 212381379 | U | 1/2021 |
| CN | 212970056 | U | 4/2021 |
| CN | 113347409 | A | 9/2021 |
| JP | 11-275675 | A | 10/1999 |
| JP | 6630930 | B1 | 1/2020 |

OTHER PUBLICATIONS

Notice of Grant received for Chinese patent application No. 202210093985.1 mailed on Feb. 4, 2026, 5 pages (2 pages English Translation and 3 pages Original document).

* cited by examiner

STRAP ASSEMBLY OF HEAD-MOUNTED DEVICE, HEAD-MOUNTED DEVICE

CROSS REFERENCE

The present application claims the priority to Chinese Patent Application No. 202210093985.1 filed on Jan. 26, 2022, and entitled "Strap Assembly of Head-Mounted Device, Head-Mounted Device", which is hereby incorporated by reference in its entirety.

FIELD

The present application relates to the technical field of head-mounted device, and in particular relates to a strap assembly of head-mounted device, head-mounted device.

BACKGROUND

In the wearable device of the prior art, the speaker is usually placed in a middle shell with a fixed position, and then the sound is transmitted to the vicinity of the ear of the user through a sound guide tube. Then, During the transmission process of the sound emitted by the speaker in the sound guide tube, the quality of the sound will decrease, and therefore there is an improved requirement.

SUMMARY

The present application aims to at least solve one of the technical problems existing in the prior art. To this end, one purpose of this application is to provide a strap assembly of head-mounted device. The strap assembly of the head-mounted device does not need to be provided with a sound guide tube to transmit sound, which is beneficial to ensuring the sound quality of the head-mounted device and improving the usage experience of user.

The present application further provides a head-mounted device having the above strap assembly.

A strap assembly of a head-mounted device according to an embodiment of the first aspect of the present application, the strap assembly includes: a fixed shell having a concave arc surface; a strap shell rotatably arranged on the fixed shell and having a convex arc surface that is in sliding-fit with the concave arc surface; and a speaker arranged inside the strap shell, the speaker and the strap shell define front and rear sound cavities that are spaced apart, the strap shell has a sound output hole that is in communication with the front sound cavity.

According to the strap assembly of the head-mounted device of the embodiments of the present application, compared with the technical solution in the related art of arranging the speaker on the display module of the head-mounted device, the speaker is integrated on the strap shell can reduce the size of the head-mounted device. Compared with the technical solution in the related art of arranging the speaker in the fixed shell, by arranging the speaker in the strap shell, the distance between the speaker and the sound hole is reduced, which helps to ensure the sound quality of the head-mounted device, thereby improving the usage experience of user.

According to some embodiments of the present application, the strap shell is in a nested arrangement with the fixed shell, and an inner peripheral wall of the fixed shell is in sealing-fit with an outer peripheral wall of the strap shell through a sealing member.

In some embodiments, a peripheral wall of the strap shell has a vent hole that is in communication with the rear sound cavity, the fixed shell defines an airflow channel that is in communication with an external environment, and the airflow channel is in communication with the vent hole.

In some examples, the air holes of the airflow channel are formed on an inner peripheral wall of the fixed shell, the sealing member comprises first and second sealing rings sleeved on the peripheral wall of the strap shell and are respectively located on both sides of the vent hole in an extension direction of a rotation axis of the strap shell.

In some examples, the vent hole comprises a plurality of vent holes arranged at intervals in a circumferential direction of the peripheral wall of the strap shell, and a distance between two adjacent ones of the vent holes in the circumferential direction of the strap shell is smaller than a size of the air holes of the airflow channel in the circumferential direction of the strap shell.

In some examples, the fixed shell includes: a fixed base; a fixed cover arranged on one end of the fixed base and defining an installation cavity with the fixed base; a cover body arranged within the installation cavity, and the airflow channel is defined either between the cover body and the fixed base or by the cover body itself.

In some specific examples, the other end of the fixed base defines a fixing cavity, a part of the strap shell is inserted into the fixing cavity, and the air holes of the airflow channel extend from an inner peripheral wall of the fixed base to a top wall of the fixed base.

In some specific examples, the cover body has an air outlet hole that is in communication with the airflow channel.

In some examples, the strap shell includes: a connection base on which the speaker is arranged; a connection cover arranged on the connection base, the front sound cavity is defined between the connection cover, the connection base and the speaker, and the rear sound cavity is defined between the connection base and the speaker.

In some specific examples, the connection base has a sound output channel that communicates the sound output hole with the front sound cavity.

In some specific examples, the sound output channel extends obliquely in a direction away from the speaker to a side of the connection base facing away from the connection cover.

In some specific examples, the strap shell further comprises a fixture cooperating with the connection base and the connection cover, and the sound output hole is defined either between the fixture and the fixed shell or by the fixture itself.

In some specific examples, a wire routing cavity for accommodating a wire harness is defined between a peripheral wall of the connection cover, a peripheral wall of the connection base and the fixed shell, and the wiring harness is adapted to be arranged side by side along a height direction of the connection base.

A head-mounted device according to the second aspect of the embodiment of the present application includes a strap assembly of the head-mounted device according to the above embodiment.

According to the head-mounted device of embodiments of the present application, by using the above strap assembly, not only the size of the display module of the head-mounted device can be reduced, but also the distance between the speaker and the sound hole can be reduced, which is beneficial to ensuring the sound quality of the head-mounted device, thereby improving the usage experience of user.

Additional aspects and advantages of the present application will be given in part in the following description, and some will become apparent from the following description, or be learned from the practice of the present application.

BRIEF DESCRIPTION OF THE DRAWINGS

The above and/or additional aspects and advantages of the present application will become apparent and readily understood from the description of embodiments in conjunction with the following drawings, in which.

Figure 1:
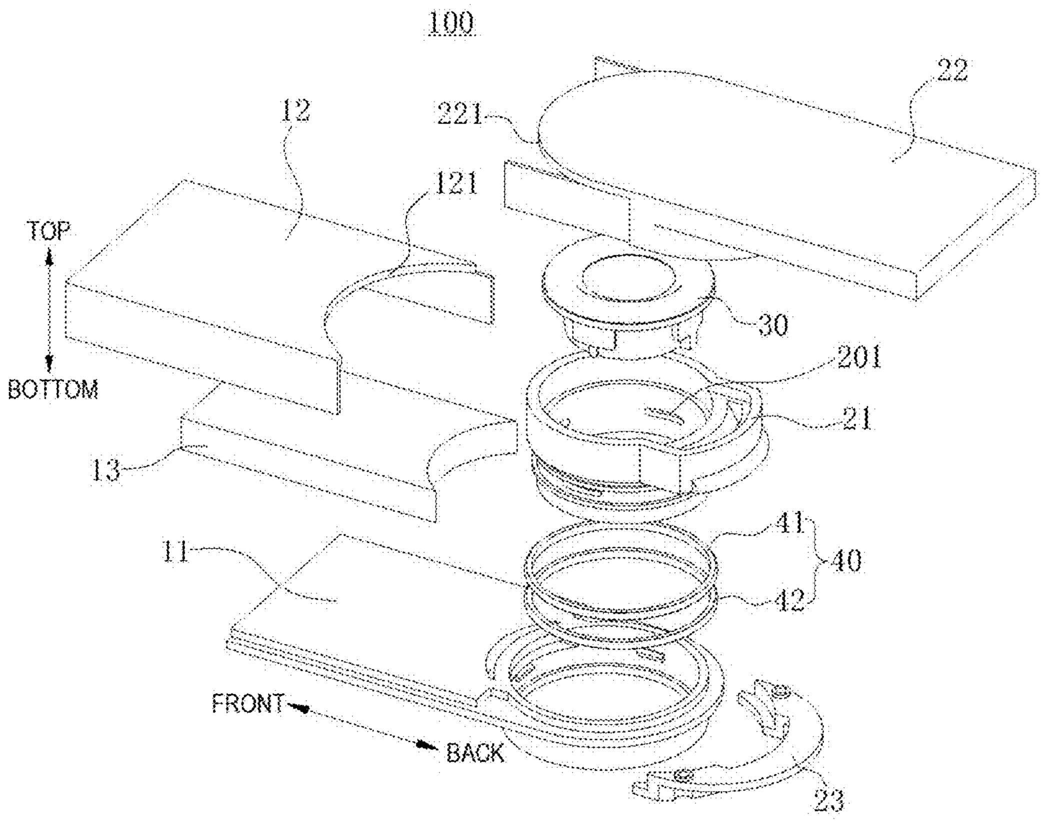
FIG. 1 is an exploded structural view of the strap assembly of the head-mounted device according to the embodiments of the present application.

REFERENCE SIGNS strap assembly 100, fixed shell 10, air hole 101, air outlet hole 102, installation cavity 103, airflow channel 104, fixed base 11, locking protrusions 111, guide surface 112, fixed cavity 113, fixed cover 12, concave arc surface 121, cover body 13, strap shell 20, vent hole 201, locking groove 202, sound output channel 203, wire routing cavity 204, connection base 21, connection cover 22, convex arc surface 221, fixture 23, sound output hole 231, speaker 30, front sound chamber 301, rear sound chamber 302, sealing member 40, first sealing ring 41, second sealing ring 42, wire harness 50.

DETAILED DESCRIPTION

Embodiments of the present application are described in detail below, examples of the embodiments are shown in the drawings, wherein the same or similar reference numerals throughout represent the same or similar elements or elements with the same or similar functions. The embodiments described below with reference to the drawings are exemplary and are only used to explain the present application and cannot be understood as limiting the present application.

The strap assembly 100 of the head-mounted device according to the embodiments of the present application is described below with reference to FIGS. 1-7.

As shown in FIG. 1, the strap assembly 100 of the head-mounted device according to the embodiments of the present application includes a fixed shell 10, a strap shell 20 and a speaker 30.

Referring to FIGS. 1 to 5, the fixed shell 10 has a concave arc surface 121, and the strap shell 20 rotatably arranged on the fixed shell 10, that is, the strap shell 20 can rotate relative to the fixed shell 10, and the strap shell 20 has a convex arc surface. 221. When the strap shell 20 rotates relative to the fixed shell 10, the convex arc surface 221 is in sliding-fit with the concave arc surface 121, which not only ensures the compactness of the structure, but also can form an effective avoidance to prevent interference between the two.

Further, the speaker 30 is arranged inside the strap shell 20. The speaker 30 and the strap shell 20 define a front sound cavity 301 and a rear sound cavity 302 that are spaced apart, the strap shell 20 has a sound outlet hole 231 that is in communication with the front sound cavity 301.

According to the strap assembly 100 of the head-mounted device of embodiments of the present application, compared with the technical solution of arranging the speaker 30 on the display module of the head-mounted device in the related art, the speaker 30 is integrated on the strap shell 20 can reduce the size of the head-mounted device. Compared with the technical solution in the related art of arranging the speaker 30 in the fixed shell 10, by arranging the speaker 30 in the strap shell 20, the distance between the speaker 30 and the sound output hole 231 is reduced, which helps to ensure the sound quality of the head-mounted device, thereby improving the usage experience of user.

Figure 2:
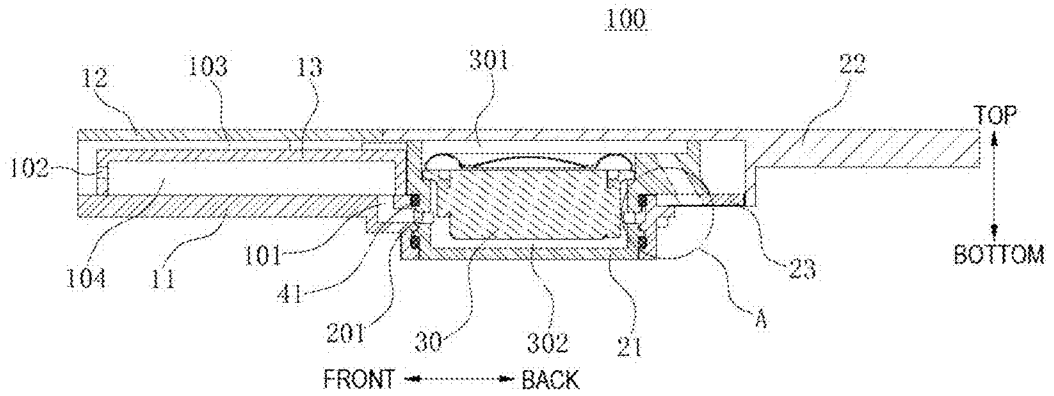
FIG. 2 is a structural cross-sectional view of the strap assembly of the head-mounted device in one direction according to the embodiments of the present application.
Figure 3:
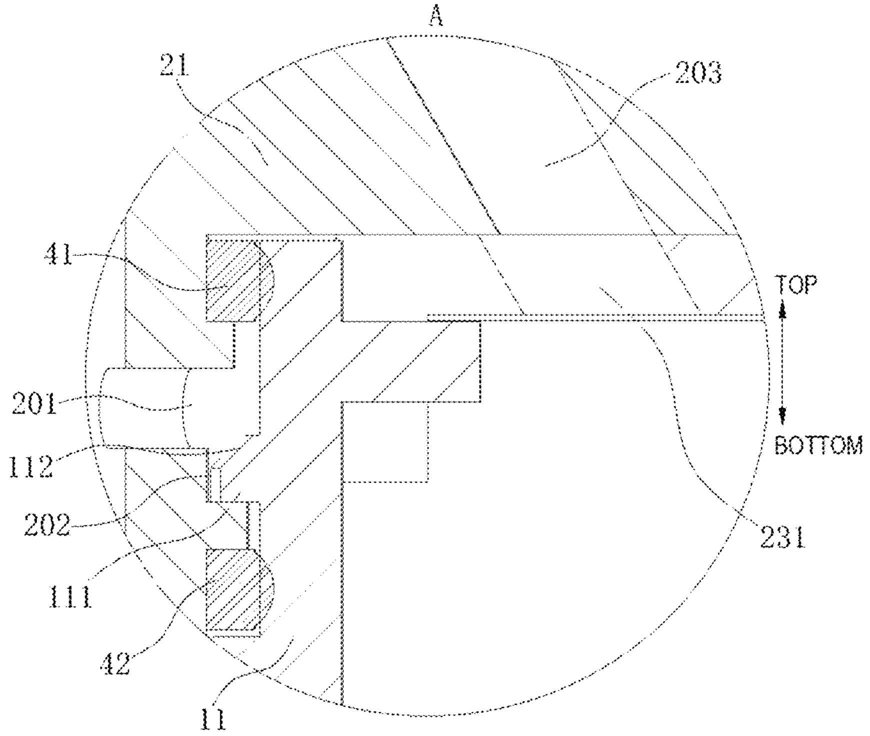
FIG. 3 is an enlarged view of part A shown in FIG. 2.

As shown in FIGS. 2 and 3, according to some embodiments of the present application, the strap shell 20 is in a nested arrangement with the fixed shell 10, so that the strap shell 20 can rotate relative to the fixed shell 10. For example, the strap shell 20 can be nested arrangement on the outside of the fixed shell 10, and for another example, the fixed shell 10 can be nested arrangement on the outside of the strap shell 20.

In some embodiments, the inner peripheral wall of the fixed shell 10 is in sealing-fit with an outer peripheral wall of the strap shell 20 through a sealing member 40, that is, at least a part of the fixed shell 10 is nested arrangement on the outside of the strap shell 20.

Therefore, by arranging the sealing member 40 between the inner peripheral wall of the fixed shell 10 and the outer peripheral wall of the strap shell 20, when the strap shell 20 rotates relative to the fixed shell 10, the sealing member 40 can provide a damping force, so that the strap shell 20 can be hovered at any position, which facilitates adjusting the position of the strap assembly 100 relative to the main body of the head-mounted device.

In some embodiments, the peripheral wall of the strap shell 20 has a vent hole 201 that is in communication with the rear sound cavity 302, the fixed shell 10 defines an airflow channel 104 that is in communication with an external environment, and the airflow channel 104 is in communication with the vent hole 201. so that the rear sound cavity 302 and the airflow channel 104 are connected. By providing the airflow channel 104 that can connect the rear sound cavity 302 with the outside world, thereby further ensuring the sound quality of the speaker 30.

As shown in FIGS. 2 and 3, in some examples, the air holes 101 of the airflow channel 104 are formed on the inner peripheral wall of the fixed shell 10, and the sealing member 40 includes a first sealing ring 41 and a second sealing ring 42. The first sealing ring 41 and the second sealing ring 42 are sleeved on the peripheral wall of the strap shell 20, and the first sealing ring 41 and the second sealing ring 42 arranged at intervals in the extension direction of the rotation axis of the strap shell 20. The first sealing ring 41 and the second sealing rings 42 are respectively located on both sides of the vent hole 201 in the extension direction of the rotation axis of the strap shell 20.

When the strap shell 20 is installed in place on the fixed shell 10, the vent hole 201 is directly opposite to at least a part of the air hole 101 of the airflow channel 104, so that the air hole 101 of the airflow channel 104 is in communication with the vent hole 201, and, A first sealing ring 41 and a second sealing ring 42 are located on both sides of the vent hole 201, that is, the first sealing ring 41 and the second sealing ring 42 are located on both sides of the air hole 101, thereby ensuring the air tightness connection between the airflow channel 104 and the rear sound cavity 302, avoiding the phenomenon of air leakage, and further ensuring the sound quality of the speaker 30.

Wherein the first sealing ring 41 and the second sealing ring 42 may be made of silicone material respectively.

In some examples, the vent holes 201 include a plurality of vent holes 201 arranged at intervals in the circumference direction of the peripheral wall of the strap shell 20, and the distance between two adjacent ones of the vent holes 201 in the circumferential direction of the strap shell 20 is smaller than the size of the air holes 101 of the airflow channel 104 in the circumferential direction of the strap shell 20.

In this way, when the user uses the head-mounted device and adjusts the strap shell, when the strap shell 20 rotates to any position relative to the fixed shell 10, the air hole 101 of the airflow channel 104 can be communication with at least one vent hole 201, ensuring that the speaker 30 sound can be produced normally, thereby ensuring the user's experience.

In order to ensure that the speaker 30 can produce sound normally, the air holes 101 and the vent holes 201 of the airflow channel 104 can respectively form arc-shaped holes extending along the circumferential direction of the strap shell 20, and the extension length of the air hole 101 of the airflow channel 104 is longer than the distance between any two adjacent vent holes 201, and the structure is simple and easy to implement.

In some examples, the fixed shell 10 includes a fixed base 11, a fixed cover 12 and a cover body 13. The fixed cover 12 arranged on one end of the fixed base 11, and the fixed cover 12 defines an installation cavity 103 with and the fixed base 11. The cover body 13 arranged within the installation cavity 103, and the airflow channel 104 is defined either between the cover body 13 and the fixed base 11 or the cover body 13 itself.

Figure 4:
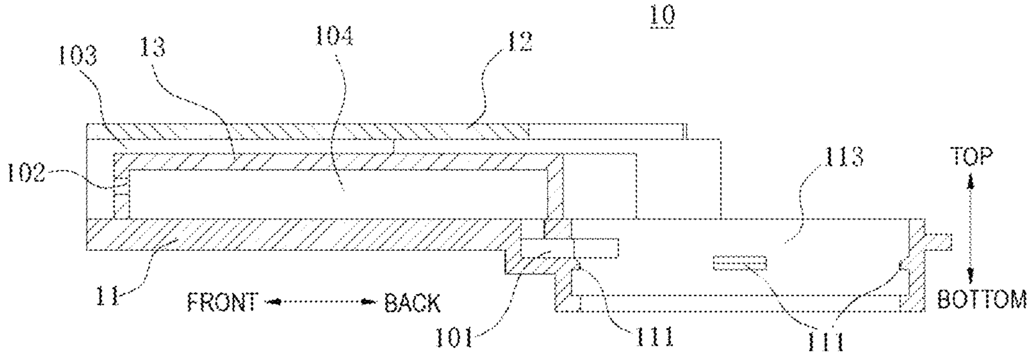
FIG. 4 is a schematic structural diagram of the fixed shell shown in FIG. 2.
Figure 6:
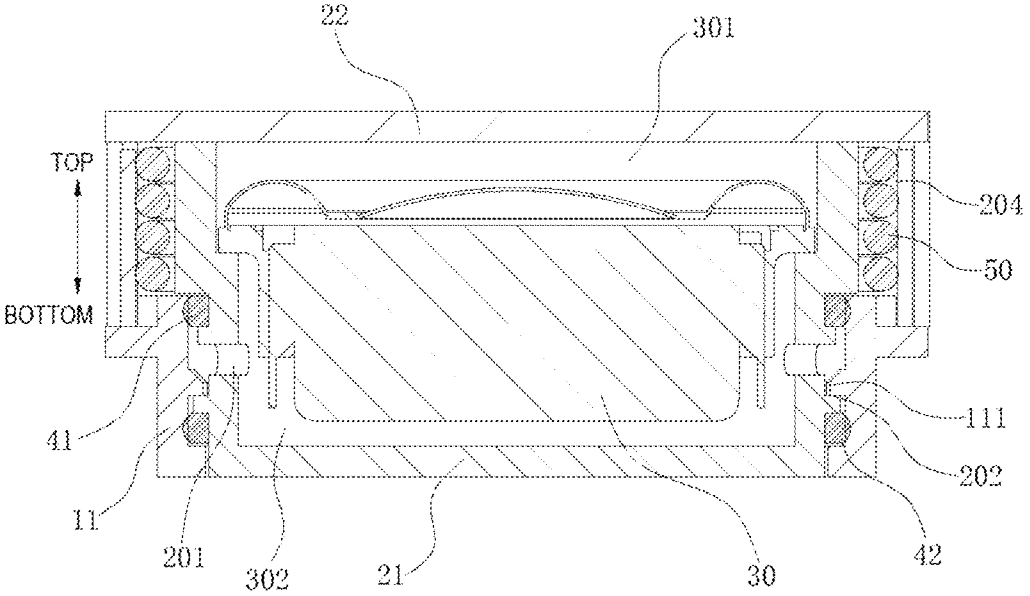
FIG. 6 is a structural cross-sectional view of the strap assembly of the head-mounted device in another direction according to the embodiments of the present application.

Specifically, as shown in FIGS. 4 and 6, in this example, the fixed base 11 extends in the front-rear direction. The fixed base 11 includes a part located on the front side and another part located on the rear side. The fixed cover 12 is arranged above the front portion of the fixed base 11. The installation cavity 103 with a front end opening is defined between the fixed cover 12 and the fixed base 11. The cover body 13 is arranged above the front of the fixed base 11, and the airflow channel 104 is defined between the cover body 13 and the fixed base 11. The airflow channel 104 extends in the front-to-back direction. One end of the airflow channel 104 is in communication with the air hole 101. The air hole 101 is formed on the fixed base 11. The structure is simple and compact.

In some specific examples, the other end of the fixing base 11 defines a fixing cavity 113, and a part of the strap shell 20 is inserted into the fixing cavity 113, that is, the strap shell 20 is plug-fitted with the fixing base 11, so that the strap shell 20 can be rotatable relative to the fixed base 11.

Wherein the air holes 101 of the airflow channel 104 extend from the inner peripheral wall of the fixed base 11 to the top wall of the fixed base 11, so that the air holes 101 communicate with the airflow channel 104 and the fixed cavity 113. After the strap shell 20 and the fixed shell 10 are assembled in place, the vent holes 201 on the strap shell 20 are communication with the air holes 101, so that the rear sound cavity 302 in communication with the airflow channel 104.

In some specific examples, the cover body 13 has an air outlet 102, and the air outlet 102 is in communication with the airflow channel 104.

Specifically, as shown in FIGS. 4 and 6 in this example, the fixed base 11 extends in the front-rear direction. The fixed base 11 includes a part located on the front side and another part located on the rear side. The fixed cover 12 is arranged above the front of the fixed base 11. The installation cavity 103 with a front end opening is defined between the fixed cover 12 and the fixed base 11. The cover body 13 is arranged above the front of the fixed base 11, and the airflow channel 104 is defined between the cover body 13 and the fixed base 11. The airflow channel 104 extends in the front and rear direction, the rear end of the airflow channel 104 is in communication with the air hole 101, the air hole 101 is formed on the fixed base 11, the air outlet hole 102 of the airflow channel 104 is formed on the front end of the cover body 13, the fixed seat The rear portion of 11 defines a fixing cavity 113 with a top opening and a bottom opening, so that the strap shell 20 can be rotatably matched with the fixing base 11.

Figure 5:
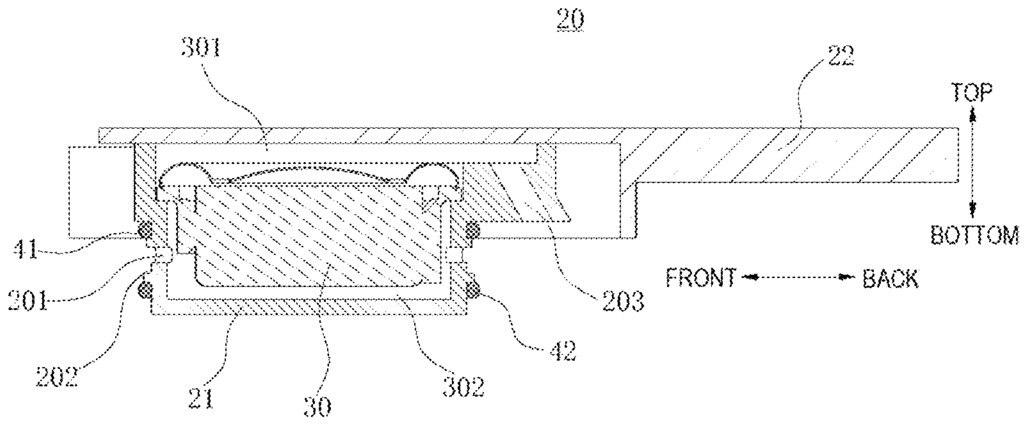
FIG. 5 is an assembly diagram of the strap shell and speaker shown in FIG. 2.

As shown in FIGS. 5 and 6, in some examples, the strap shell 20 includes a connection base 21 and a connection cover 22. The speaker 30 is arranged on the connection base 21, and the connection cover 22 arranged on the connection base 21. The front sound cavity 301 is defined between the connection cover 22, the connection base 21 and the speaker 30, and the rear sound cavity 302 is defined between the connection base 21 and the speaker 30.

Among them, the speaker 30 and the connecting base 21 can be connected together by bonding, snapping, etc., thereby using the speaker 30 to isolate the inner cavity of the strap shell 20 into a front sound cavity 301 and a rear sound cavity 302. The connecting base 21 and the connecting cover 22 can be connected together by bonding, snapping, etc., thereby ensuring the sealing and reliability of the connection between the connecting base 21 and the connecting cover 22, ensuring the relative sealing of the front sound cavity 301, and allowing the speaker 30 to pass through the sound output hole 231 make a sound.

As shown in FIG. 6, in this embodiment, the fixed base 11 defines a fixed cavity 113 with a top opening and a bottom opening. The inner peripheral wall of the fixed base 11 is provided with a plurality of locking protrusions 111. The plurality of locking protrusions 111 are arranged at intervals along the circumferential direction of the inner peripheral wall of the fixed base 11. The outer peripheral wall of the connecting base 21 has a locking groove 202. The locking groove 202 extends along the circumferential direction of the connecting base 21. The plurality of locking protrusions 111 cooperate with the locking groove 202 to ensure that the fixed base 11 is connected to the connecting base 21. The connection reliability of the connecting base 21 prevents the connection base 21 from falling out of the fixed base 11.

In order to ensure that the fixed base 11 and the connecting base 21 can mate smoothly, a guide surface 112 is provided on the latching protrusion 111, and the guide surface 112 extends obliquely from top to bottom toward the center of the fixed cavity 113.

As shown in FIGS. 2 to 3 and 5, in some specific examples, the connection base 21 has a sound outlet channel 203, which is in communication with the sound outlet hole 231 and the front sound cavity 301, so that sound can be transmitted, thereby ensuring improve the sound quality of the head-mounted device, thus improving the user experience.

In some specific examples, the sound output channel 203 extends obliquely in a direction away from the speaker 30 to a side of the connection base 21 facing away from the connection cover 22. By arranging the sound output channel 203 in this way, the distance between the speaker 30 and the sound output hole 231 is reduced, which is beneficial to ensuring the sound quality of the head-mounted device, thereby improving the user experience.

In some specific examples, the strap shell 20 further includes a fixture 23 that cooperates with the connection base 21 and the connection cover 22, and a sound output hole 231 is defined between the fixture 23 and the fixing shell 10, or the fixture 23 itself is limited to a sound output hole 231.

Therefore, by providing the fixture 23, not only the strap can be fixed, but also the connecting base 21 can be sandwiched between the fixture 23 and the connection cover 22, ensuring the compact structure of the strap shell 20. Moreover, the distance between the speaker 30 and the sound output hole 231 is also reduced, which is beneficial to ensuring the sound quality of the head-mounted device, thereby improving the user experience.

Figure 7:
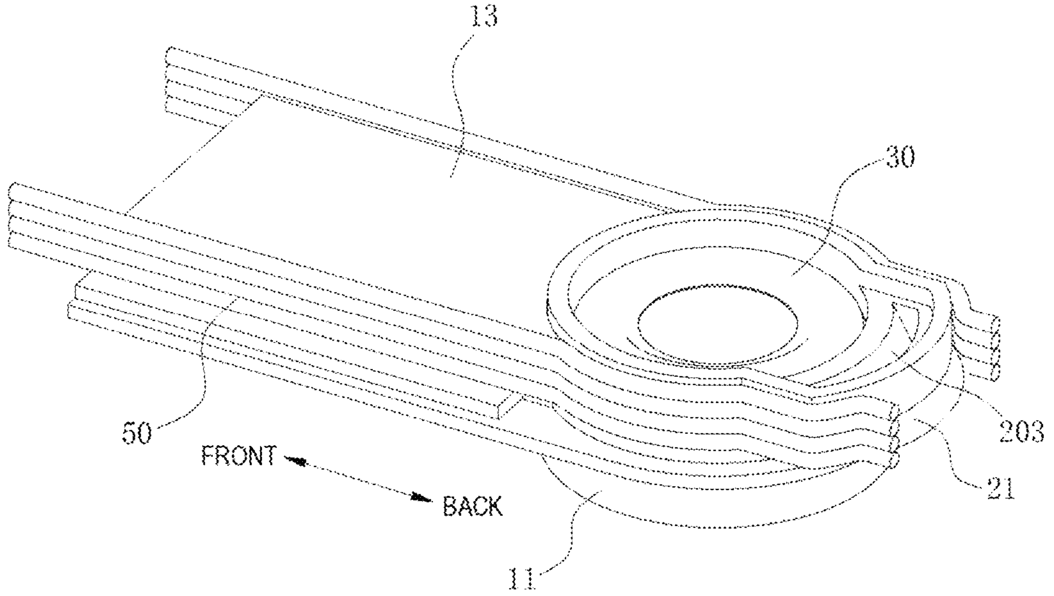
FIG. 7 is a schematic assembly diagram of the strap assembly and the wire harness of the head-mounted device shown in FIG. 6.

As shown in FIGS. 6 and 7, in some specific examples, a wire routing cavity 204 for accommodating the wire harness 50 is defined between the peripheral wall of the connection cover 22, the peripheral wall of the connection base 21 and the fixed shell 10, and the wire harnesses 50 is adapted to be arranged side by side along the height direction of the connection base 21.

It can be understood that the wire harness 50 here can be a battery wire harness 50 or a communication wire harness 50. The wire harnesses 50 can be arranged side by side along the height direction of the connection base 21, and can be routed close to the outer surface of the peripheral wall of the connection base 21, which solves the problem of the imbalance of torsional force when the wire harness 50 are placed in a horizontally row, the stress on the wire harness 50 is reduced, and the service life of the wire harness 50 is extended.

A head-mounted device (not shown) according to the embodiments of the present application includes a strap assembly 100 of the head-mounted device according to the above embodiments. Since the strap assembly 100 of the head-mounted device according to the embodiments of the present application has the above technical effects, the head-mounted device according to the embodiments of the present application also has the above technical effects, that is, by using the above-mentioned strap assembly 100, not only the volume of the display module of the head-mounted device can be reduced, but also the distance between the speaker 30 and the sound output hole 231 is reduced, which is conducive to ensuring the sound quality of the head-mounted device, thereby improving the user experience.

In the description of this application, it needs to be understood that the terms “center”, “longitudinal”, “transverse”, “length”, “width”, “thickness”, “upper”, “lower”, “front”, “The orientation or positional relationship indicated by “back”, “vertical”, “horizontal”, “top”, “bottom”, “inner”, “outer”, “axial”, “radial”, “circumferential”, etc. is The orientation or positional relationship shown in the drawings is only for the convenience of describing the present application and simplifying the description. It does not indicate or imply that the device or element referred to must have a specific orientation, be constructed and operated in a specific orientation, and therefore cannot be understood. as a limitation on this application.

Other structures and operations of the head-mounted device according to the embodiments of the present application are known to those of ordinary skill in the art and will not be described in detail here.

In the description of this specification, reference to the description of the terms “an embodiment”, “some embodiments”, “illustrative embodiments”, “example”, “specific examples”, or “some examples”, etc. is meant to be described in connection with the embodiments or examples the specific features, structures, materials or characteristics are included in at least one embodiment or example of this application. In this specification, schematic representations of the above terms do not necessarily refer to the same embodiments or examples. Furthermore, the specific features, structures, materials or characteristics described may be combined in any suitable manner in any one or more embodiments or examples.

Although the embodiments of the present application have been shown and described, those of ordinary skill in the art will understand that various changes, modifications, substitutions and modifications can be made to these embodiments without departing from the principles and purposes of the present application. The scope of is defined by claims and their equivalents.

We claim:

1. A strap assembly of a head-mounted device, comprising:

a fixed shell having a concave arc surface;

a strap shell rotatably arranged on the fixed shell and having a convex arc surface that is in sliding-fit with the concave arc surface; and a speaker arranged inside the strap shell, the speaker and the strap shell define front and rear sound cavities that are spaced apart, the strap shell has a sound output hole that is in communication with the front sound cavity, wherein a peripheral wall of the strap shell has a vent hole that is in communication with the rear sound cavity, the fixed shell defines an airflow channel that is in communication with an external environment, and the airflow channel is in communication with the vent hole.

2. The strap assembly of the head-mounted device of claim 1, wherein the strap shell is in a nested arrangement with the fixed shell, and an inner peripheral wall of the fixed shell is in sealing-fit with an outer peripheral wall of the strap shell through a sealing member.

3. The strap assembly of the head-mounted device of claim 1, wherein air holes of the airflow channel are formed on an inner peripheral wall of the fixed shell, the sealing member comprises first and second sealing rings sleeved on the peripheral wall of the strap shell and are respectively located on both sides of the vent hole in an extension direction of a rotation axis of the strap shell.

4. The strap assembly of the head-mounted device of claim 1, wherein the vent hole comprises a plurality of vent holes arranged at intervals in a circumferential direction of the peripheral wall of the strap shell, and a distance between two adjacent ones of the vent holes in the circumferential direction of the strap shell is smaller than a size of the air holes of the airflow channel in the circumferential direction of the strap shell.

5. The strap assembly of the head-mounted device of claim 1, wherein the fixed shell comprises:

a fixed base;

a fixed cover arranged on one end of the fixed base and defining an installation cavity with the fixed base;

a cover body arranged within the installation cavity, and the airflow channel is defined either between the cover body and the fixed base or by the cover body itself.

6. The strap assembly of the head-mounted device of claim 5, wherein the other end of the fixed base defines a fixing cavity, a part of the strap shell is inserted into the fixing cavity, and the air holes of the airflow channel extend from an inner peripheral wall of the fixed base to a top wall of the fixed base.

7. The strap assembly of the head-mounted device of claim 5, wherein the cover body has an air outlet hole that is in communication with the airflow channel.

8. The strap assembly of the head-mounted device of claim 1, wherein the strap shell comprises:

a connection base on which the speaker is arranged;

a connection cover arranged on the connection base, the front sound cavity is defined between the connection cover, the connection base and the speaker, and the rear sound cavity is defined between the connection base and the speaker.

9. The strap assembly of the head-mounted device of claim 8, wherein the connection base has a sound output channel that communicates the sound output hole with the front sound cavity.

10. The strap assembly of the head-mounted device of claim 8, wherein the sound output channel extends obliquely in a direction away from the speaker to a side of the connection base facing away from the connection cover.

11. The strap assembly of the head-mounted device of claim 8, wherein the strap shell further comprises a fixture cooperating with the connection base and the connection cover, and the sound output hole is defined either between the fixture and the fixed shell or by the fixture itself.

12. The strap assembly of the head-mounted device of claim 8, wherein a wire routing cavity for accommodating a wire harness is defined between a peripheral wall of the connection cover, a peripheral wall of the connection base and the fixed shell, and the wiring harness is adapted to be arranged side by side along a height direction of the connection base.

13. A head-mounted device, comprising a strap assembly of the head-mounted device and a wire harness, wherein the strap assembly comprises:

a fixed shell having a concave arc surface;

a strap shell rotatably arranged on the fixed shell and having a convex arc surface that is in sliding-fit with the concave arc surface; and a speaker arranged inside the strap shell, the speaker and the strap shell define front and rear sound cavities that are spaced apart, the strap shell has a sound output hole that is in communication with the front sound cavity, wherein a peripheral wall of the strap shell has a vent hole that is in communication with the rear sound cavity, the fixed shell defines an airflow channel that is in communication with an external environment, and the airflow channel is in communication with the vent hole.

14. The head-mounted device of claim 13, wherein the strap shell is in a nested arrangement with the fixed shell, and an inner peripheral wall of the fixed shell is in sealing-fit with an outer peripheral wall of the strap shell through a sealing member.

15. The head-mounted device of claim 13, wherein air holes of the airflow channel are formed on an inner peripheral wall of the fixed shell, the sealing member comprises first and second sealing rings sleeved on the peripheral wall of the strap shell and are respectively located on both sides of the vent hole in an extension direction of a rotation axis of the strap shell.

16. The head-mounted device of claim 13, wherein the vent hole comprises a plurality of vent holes arranged at intervals in a circumferential direction of the peripheral wall of the strap shell, and a distance between two adjacent ones of the vent holes in the circumferential direction of the strap shell is smaller than a size of the air holes of the airflow channel in the circumferential direction of the strap shell.

17. The head-mounted device of claim 13, wherein the fixed shell comprises:

a fixed base;

a fixed cover arranged on one end of the fixed base and defining an installation cavity with the fixed base;

a cover body arranged within the installation cavity, and the airflow channel is defined either between the cover body and the fixed base or by the cover body itself.

18. The head-mounted device of claim 17, wherein the other end of the fixed base defines a fixing cavity, a part of the strap shell is inserted into the fixing cavity, and the air holes of the airflow channel extend from an inner peripheral wall of the fixed base to a top wall of the fixed base.

* * * * *